May 3, 1932.  H. H. HUNTER  1,856,766
GRAIN SAMPLER
Filed April 11, 1930
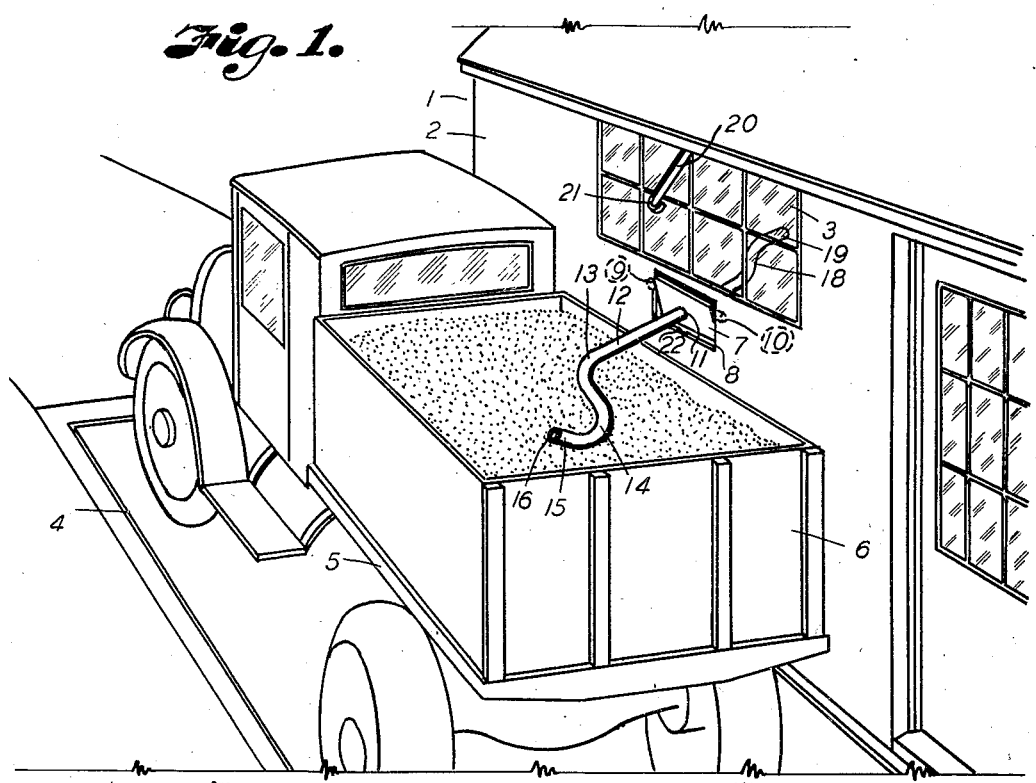
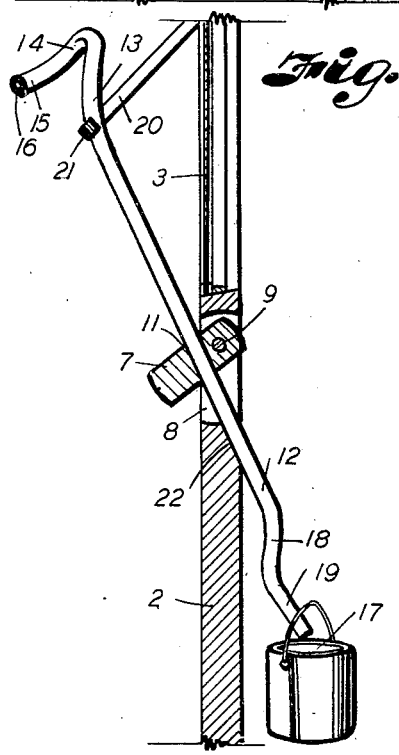
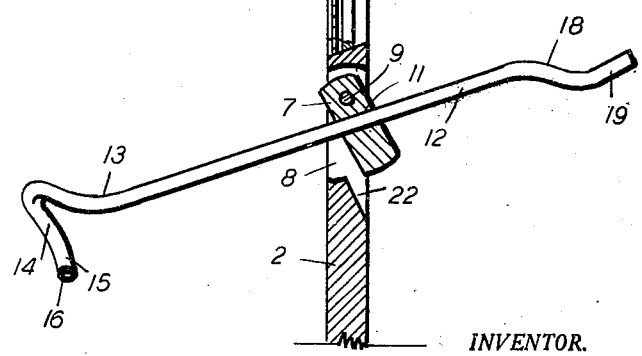
INVENTOR.
Harry H. Hunter
BY
ATTORNEY Patented May 3, 1932

1,856,766

UNITED STATES PATENT OFFICE

HARRY H. HUNTER, OF ATTICA, KANSAS

GRAIN SAMPLER

Application filed April 11, 1930. Serial No. 443,359.

My invention relates to grain samplers whereby a small portion of grain may be taken from a truck or the like for close examination to determine the character and grade of the grain.

In ordinary practice a pan or bucket is employed for scooping up a small quantity of the grain, or a trier is introduced into the body of grain to obtain a sample from the interior of the body. In either usage, the person obtaining the sample must have direct access to the body of grain. There are numerous situations in which the person desiring a sample of grain is separated by a wall from the body of grain, for example when a weigher stationed in a scale house desires a sample of the grain contained by a relatively high-bodied truck positioned on the scales. The weigher must leave his station and go out of the house to the truck to obtain the sample, or open a window to introduce a sampler into the body of grain or to receive a sample extracted by a second party, any of the courses mentioned involving inconvenience, loss of time, and uneconomical expenditure of effort to obtain the sample, and requiring the use of a sampler that can be carried about and may be misplaced or may not be conveniently available when required.

The principal objects of my invention therefore are to mount a sampler in fixed position on a wall adjacent the position of grain to be sampled, to provide a sampler on a scale house that may be manipulated to obtain a sample of grain and deliver the sample to the weigher, and to enable a weigher in a scale house to obtain a sample of grain from a truck positioned on scales exterior to the scale house, without leaving the house or opening windows.

In accomplishing these and other objects of my invention, I have provided improved details of structure, the preferred forms of which are illustrated in the accompanying drawings, wherein:

Fig. 1 is perspective view of portions of a scale house and a truck standing on scales adjacent the house, and my improved grain sampler mounted on a wall of the house.

Fig. 2 is a fragmentary section of the house wall through the device, illustrating the sampler in retracted position for delivering a sample of grain.

Fig. 3 is a similar view illustrating the sampler in position to obtain a sample of grain.

Referring in detail to the drawings:

1 designates a scale house including a wall 2 provided with a window 3, and 4 designates a scale platform exterior to the house for supporting a truck 5 including a body 6 containing grain, the indicating portion of the scale mechanism (not shown), being located with the house adjacent the window.

My device includes a support 7 comprising preferably a rectangular block of wood adapted to fit snugly but movably in an opening 8 formed in the wall 2 below the window, and may consist of a portion of the wall cut out for the purpose, and provided with lateral pivots 9 adjacent the upper edge of the block mounted in suitable bearing recesses 10 in the side edges of the opening. The upper and lower edges of the block and opening are curved complementarily to promote sealing of the opening when the block registers with the wall, and to permit the block to pivot freely.

Rotatively and slidably mounted in a central aperture 11 in the block, is a tube 12 having an outer end bent laterally to form an elbow 13 and then semi-circularly to form a scoop-like portion 14 extending in a plane substantially perpendicular to the axis of the body of the tube. The outer extremity of the tube is preferably bent outwardly away from the plane of the portion 14 to provide a scoop-like end portion 15, and the tip is beveled internally to form a sharp rim 16 at the outer edge of the mouth of the tube.

The tube may thus be pivoted vertically to introduce the curved outer end in a body of grain in the truck, rotated to collect a sample, and then tilted to effect delivery of the sample into a bucket 17.

In order to facilitate operation of the sampler, a crank is provided on the inner end of the tube, preferably comprising a portion 18 bent slightly laterally and an end portion 19 bent into parallelism with the body of the tube.

A strap 20 fixed to the wall 2 above the window has a hook 21 located to receive the curved portion of the tube, whereby the tube may be retained in retracted position.

A slanting notch 22 is formed in the inner face of the wall 2 to provide a seat for the tube when the same is retracted.

Attention is called to the fact that the support swings outwardly or inwardly from the wall when the tube is pivoted, due to the location of the pivots above the horizontal median line of the supports, and the notch therefore permits the tube to be swung more nearly into parallel relation with the wall than would be the case if the crotch were lacking.

In using the device, a weigher stationed in the house may grasp the crank handle and rotate the tube to release the curved end from the retaining hook, and lift the crank end to move the curved outer end downwardly toward and into the body of grain in the truck. He may then rotate the tube to cause the scoop-like outer end to burrow into the body of grain, and collect a sample from below the surface.

The sample will consist of a quantity contained in the curved end portion. The tube may then be pivoted to elevate the outer end, and cause the sample of grain contained thereby to flow through the body and crank portion into the bucket.

It is apparent that the tube may have any desired capacity, and that the curved outer end may be formed in a manner to collect a desired quantity of grain as a sample.

What I claim and desire to secure by Letters Patent is:

1. A grain sampler including a support, and an imperforate tubular member having one end bent at an angle to the remainder of said member rotatably mounted on the support and adapted to conduct a sample of grain therethrough.

2. In a device of the character described, a support, and an imperforate member having an end bent at an angle to the remainder of said member rotatably and slidably mounted in the support having a channel for conducting a sample of grain or the like through the support.

3. A grain sampler including a support, and a tubular member rotatably mounted on the support and having a curved end portion adapted to serve as a scoop when said member is rotated in the support.

4. In a device of the character described, a body having a channel and an end portion bent substantially at right angles to the axis of the body, and pivotal means for supporting the body said angular portion serving as a scoop when the body is pivoted on said support.

5. In a device of the character described, a tube having one end bent to form a scoop and an opposhite end provided with a crank and means for rotatively supporting the tube.

6. In a device of the character described, a tube having one end bent to form a scoop and an opposite end provided with a crank, and pivotal means for rotatively supporting the tube.

7. In a device of the character described, in combination with a wall provided with an opening, a support pivotally mounted in said opening, and a sample collecting member mounted on the support and having a channel for conducting grain from one side of the wall to the other upon pivotal movement of the support.

8. In a grain sampler, in combination with a wall having an opening, a tube having one end bent to form a scoop, and means pivotally mounted in said opening having an aperature to receive the tube for relatively supporting the same.

9. In a grain sampler, in combination with a wall having an opening, a tube having one end bent to form a scoop and the opposite end bent to form a crank, and means pivotally mounted in said opening having an aperture to receive the tube for rotatably and slidably supporting the same.

In testimony whereof I affix my signature.

HARRY H. HUNTER.